US010226894B2

(12) United States Patent
Houben et al.

(10) Patent No.: US 10,226,894 B2
(45) Date of Patent: Mar. 12, 2019

(54) METHOD AND APPARATUS FOR MAKING TANGIBLE PRODUCTS BY LAYERWISE MANUFACTURING

(71) Applicant: Nederlandse Organisatie voor toegepast-natuurwetenschappelijk onderzoek TNO, 's-Gravenhage (NL)

(72) Inventors: René Jos Houben, 's-Gravenhage (NL); Leonardus Antonius Maria Brouwers, 's-Gravenhage (NL); Andries Rijfers, 's-Gravenhage (NL); Frits Kornelis Feenstra, 's-Gravenhage (NL)

(73) Assignee: NEDERLANDSE ORGANISATIE VOOR TOEGEPAST-NATUURWETEN SCHAPPELIJK ONDERZOEK TNO, 'Gravenhage (NL)

( * ) Notice: Subject to any disclaimer, the term of this patent is extended or adjusted under 35 U.S.C. 154(b) by 0 days.

(21) Appl. No.: 14/439,690

(22) PCT Filed: Oct. 30, 2013

(86) PCT No.: PCT/NL2013/050774
§ 371 (c)(1),
(2) Date: Apr. 30, 2015

(87) PCT Pub. No.: WO2014/070007
PCT Pub. Date: May 8, 2014

(65) Prior Publication Data
US 2015/0290878 A1    Oct. 15, 2015

(30) Foreign Application Priority Data
Oct. 31, 2012 (EP) .................................... 12190707

(51) Int. Cl.
*B29C 64/20* (2017.01)
*B22F 3/10* (2006.01)
(Continued)

(52) U.S. Cl.
CPC ............... *B29C 64/20* (2017.08); *B22F 3/10* (2013.01); *B22F 3/24* (2013.01); *B22F 7/02* (2013.01);
(Continued)

(58) Field of Classification Search
CPC ............ B29C 67/0081; B29C 67/0085; B29C 67/0055; B29C 67/0074;
(Continued)

(56) References Cited
U.S. PATENT DOCUMENTS 5,301,863 A * 4/1994 Prinz ....................... B22F 3/008
156/59
5,510,066 A * 4/1996 Fink ........................ C08G 18/48
156/242
(Continued)

FOREIGN PATENT DOCUMENTS

DE    10256672 A1    6/2004
EP    2289652 A1     3/2011
(Continued)

OTHER PUBLICATIONS

Machine Translation of JP02005088390A.*
Official Action issued in corresponding Japanese Application, JP201206437, dated Nov. 8, 2017.

*Primary Examiner* — Jacob J Cigna
(74) *Attorney, Agent, or Firm* — Hoffmann & Baron, LLP

(57) ABSTRACT

The invention relates to a method and a production line for making tangible products by layerwise manufacturing.
The production line comprises (i) a first and a second building platform (102, 112) for carrying a tangible product,
(Continued)

(ii) a deposition head (101) for providing a layer of construction material onto the building platforms, (iii) a conveyor (103) for conveying the building platforms in a conveying plane towards and away from the deposition head repeatedly, (iv) height adjustment means (107) to adjust the distance between the deposition head and the building platforms by displacing the building platforms relative to the conveyor in a direction (104) perpendicular to the conveying plane. The production line may further comprise a picking unit (106) for picking a product from the building platforms. The method allows making different tangible products in a continuous process by layerwise manufacturing. The method comprises a step of moving the platforms on which a product is made repeatedly past a material providing device for depositing subsequent layers and a step of adjusting the distance between such device and the building platforms by moving the platforms in a vertical direction.

13 Claims, 10 Drawing Sheets

(51) Int. Cl.
| | | |
|---|---|---|
| *B22F 3/24* | (2006.01) | |
| *B22F 7/02* | (2006.01) | |
| *B29C 64/106* | (2017.01) | |
| *B29C 64/112* | (2017.01) | |
| *B29C 64/141* | (2017.01) | |
| *B29C 64/165* | (2017.01) | |
| *B33Y 10/00* | (2015.01) | |
| *B33Y 30/00* | (2015.01) | |
| *B29L 31/00* | (2006.01) | |

(52) U.S. Cl.
CPC ......... *B29C 64/106* (2017.08); *B29C 64/112* (2017.08); *B29C 64/141* (2017.08); *B29C 64/165* (2017.08); *B22F 2003/247* (2013.01); *B29L 2031/772* (2013.01); *B33Y 10/00* (2014.12); *B33Y 30/00* (2014.12)

(58) Field of Classification Search
CPC ........ B29C 67/00–67/0096; B22F 7/02; B22F 3/10; B22F 3/24; B33Y 10/00
See application file for complete search history.

(56) References Cited

U.S. PATENT DOCUMENTS

| | | | | |
|---|---|---|---|---|
| 6,830,643 | B1 * | 12/2004 | Hayes | B41M 3/006 |
| | | | | 118/308 |
| 9,517,592 | B2 * | 12/2016 | Yoo | B29C 67/0081 |
| 2002/0145213 | A1 | 10/2002 | Liu et al. | |
| 2003/0224081 | A1 | 12/2003 | Fong | |
| 2004/0003738 | A1 * | 1/2004 | Imiolek | B22F 3/1055 |
| | | | | 101/480 |
| 2005/0228525 | A1 * | 10/2005 | Brill | G05B 19/4189 |
| | | | | 700/112 |
| 2009/0076643 | A1 | 3/2009 | Silverbrook | |
| 2009/0291308 | A1 | 11/2009 | Pfister et al. | |
| 2009/0314201 | A1 * | 12/2009 | Baccini | B41F 15/18 |
| | | | | 118/500 |
| 2010/0006640 | A1 * | 1/2010 | Culp | G06K 1/121 |
| | | | | 235/375 |
| 2012/0059504 | A1 * | 3/2012 | Pax | B29C 67/0055 |
| | | | | 700/119 |
| 2012/0211155 | A1 * | 8/2012 | Wehning | A61C 13/0013 |
| | | | | 156/275.5 |
| 2013/0108726 | A1 * | 5/2013 | Uckelmann | B29C 67/0007 |
| | | | | 425/174.4 |
| 2014/0065194 | A1 * | 3/2014 | Yoo | B29C 67/0081 |
| | | | | 424/400 |
| 2014/0167326 | A1 * | 6/2014 | Jones | B29C 67/0074 |
| | | | | 264/427 |
| 2015/0165695 | A1 * | 6/2015 | Chen | B29C 67/007 |
| | | | | 425/132 |

FOREIGN PATENT DOCUMENTS

| | | | |
|---|---|---|---|
| JP | 2005088390 A | * | 4/2005 |
| JP | 2012106437 A2 | | 6/2012 |
| WO | WO2004014637 A1 | | 2/2004 |
| WO | WO2004108398 A1 | | 12/2004 |
| WO | WO2012076205 A1 | | 6/2012 |

* cited by examiner

Fig. 10
Fig. 10A
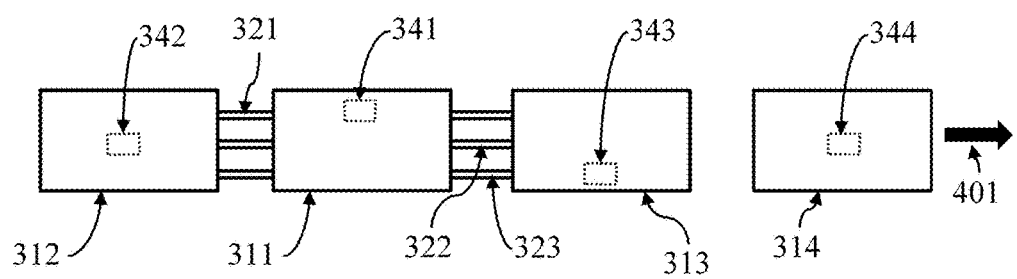
Fig. 10B
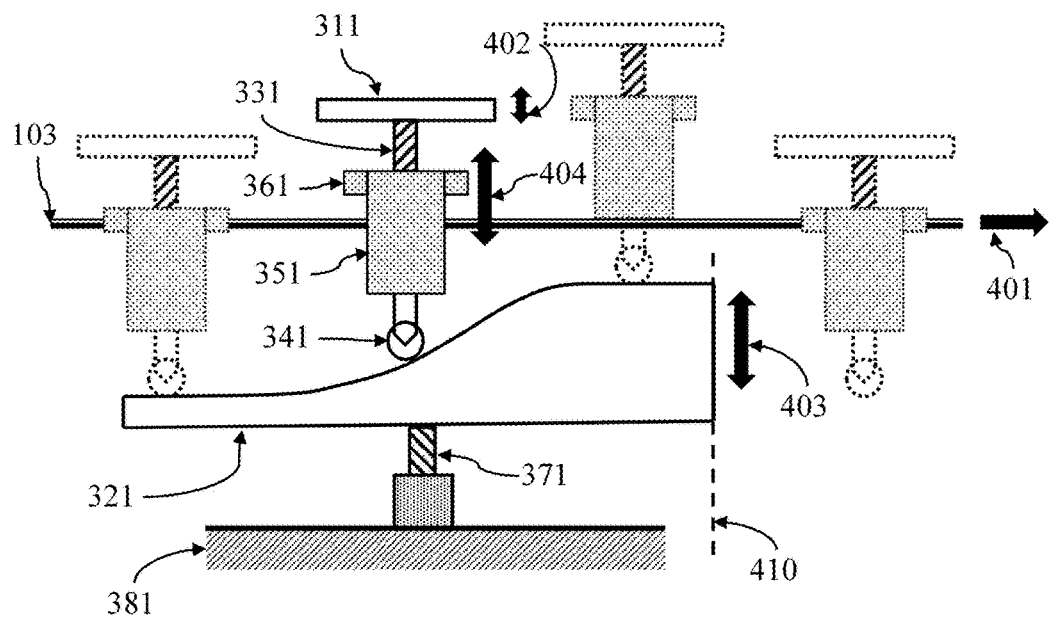

METHOD AND APPARATUS FOR MAKING TANGIBLE PRODUCTS BY LAYERWISE MANUFACTURING

This application is the U.S. National Phase of, and Applicants claim priority from, International Patent Application Number PCT/NL2013/050774 filed Oct. 30, 2013, which claims priority from EP 12190707.5 filed Oct. 31, 2012, each of which is incorporated herein by reference.

The invention relates to a method for making tangible products by layerwise manufacturing.

More in particular the invention relates to such a method comprising the steps of (i) depositing in a deposition area, by using a material providing device, a layer of construction material onto a building platform for building a first layered product, (ii) conveying, by using a conveyor, the building platform away from the deposition area, (iii) removing the first layered product from the building platform, (iv) adjusting the distance between the material providing device and the building platform in a direction that is parallel to the building direction, and (v) depositing construction material onto said platform to obtain a second layered product after the first layered product has been removed.

The invention further relates to a production line for layerwise manufacturing of tangible products.

More in particular the invention relates to such a production line comprising (i) a building platform (102) for carrying a tangible product, (ii) a deposition head (101) for providing a layer of construction material onto the building platform, (iii) a conveyor (103) for conveying the building platform in a conveying plane, and (iv) height adjustment means for adjusting the distance between the deposition head and the building platform.

STATE OF THE ART

Layerwise manufacturing is a manufacturing method wherein tangible three-dimensional products are made by successive addition of layers on top of each other, which layers correspond to the cross sections at different levels of the tangible product. Layered products can be made by providing a uniform layer of liquid or powder, which liquid or powder is solidified in a predefined two dimensional pattern corresponding to the cross section of the product to be manufactured. The remaining, not solidified material is removed afterwards. The layers can also be directly deposited in the required two dimensional pattern, for example by printing. In such a method, the pattern is already determined during deposition of the material, not by the solidification. The material can be an ink or powder, which ink or powder is cured, sintered, or otherwise solidified to obtain a coherent product.

The products are often made on top of a building platform that can be displaced in a vertical direction. However, there are also layered manufacturing systems in which the product is hanging below the building platform. An example of such a system is disclosed in German patent application DE 10256672. Typically, such a system comprises a dish with liquid that can be solidified, for example by ultraviolet (UV) light. The building platform that is positioned above the bottom of the dish, moves upwards to allow the formation of a thin liquid film between platform (or previous solidified layer) and the bottom of the dish. The film is solidified in the predefined pattern and after this solidification the platform is move further upward. These steps are repeated until the product is finished. Finally, the finished product is removed from the platform and this platform can be used for making another product.

In another known method for layerwise manufacturing of a tangible three-dimensional product, a powder is used as a starting material, which powder is solidified by for example sintering. Such a method is disclosed in United States patent application US2009/0291308. According to this known method, a thin layer of powder is provided to an area that is delimited by a vertical wall and, at the bottom side, by a building platform. The layer is solidified by sintering into a coherent solid layer with a predefined shape, being a cross section of the product. Subsequently, the platform supporting the solidified layer moves downwards and a new powder layer is applied. The steps are repeated until the product is finished. Subsequently, the part of the powder that is not solidified and the finished product are removed before making another product.

The afore-mentioned systems have in common that they have one platform that is movable in the vertical direction. Such systems are in particular suitable for making products out of one type of material. It is possible to make several products having different shapes on such a platform, simultaneously. An example of such a method is disclosed in international patent application WO2004/014637. This known method is limited to products made out of one type of material. In principle, however, also powder-based systems are suitable for making products in which individual layers are made out of different materials. Such a system is for example disclosed in United States patent application US2002/0145213. International patent application WO 2012/076205 discloses an apparatus that allows making different product quasi simultaneously. This apparatus comprises different building platforms, which provides more flexibility than systems with only one building platform.

Still another way of making tangible products by layerwise manufacturing is three-dimensional printing. In three-dimensional printing an ink is applied either as a continuous layer or in a predefined pattern corresponding to a cross section of the product. Three-dimensional printing is in certain aspects more flexible than the methods mentioned above, in particular when the ink is applied by printing heads. Different printing heads can be used to apply different materials for manufacturing composite products comprising several materials. Further, the printing heads can be switched on and off easily for better control of the manufacturing process. An example of a production line for layerwise manufacturing using print heads is disclosed in United States patent application US200910076643. This known production line can be used for making several tangible products by layerwise manufacturing. The production line comprises several printing heads for depositing material onto carriers, which printing heads are positioned above a conveyor that passes the carriers from one printing head to another printing head. The printing heads are positioned in line of each other in the conveying direction. Further, the height of each printing head can be adjusted with respect to the conveyor for example to compensate for increasing height of the product during the different stages of its manufacture, viz. the number of layers already deposited. This production line allows manufacturing of several products with different geometrical shape and different material composition. Each layer of the product is created by one or even more printing heads, resulting in a huge number of printing heads for manufacturing a product of substantial size. Also international application WO2004/108398 discloses the use of one or more build stations for depositing material layerwise on a building platform. While the machine produces multiple products, it lacks potential for scaling up to industrial volumes.

SUMMARY OF THE INVENTION

It is an objective of the present invention to provide a method for making tangible products by layerwise manufacturing, which method allows rapid manufacturing of such products at low costs.

This objective of the invention is obtained by a method for making tangible products by layerwise manufacturing comprising the steps of depositing (1) in a deposition area, by using a material providing device, a layer of construction material onto a first building platform for building a first layered product, conveying (2), by using a conveyor, the first building platform away from the deposition area, removing (3) the first layered product from the first building platform, adjusting (4) the distance between the material providing device and the first building platform in a direction that is parallel to the building direction, depositing (5) construction material onto said first building platform to obtain a second layered product after the first layered product has been removed, characterised in that said adjusting is realised by moving the first building platform relative to the conveyor and in that the conveyor moves the first building platform past the material providing device repeatedly (6) to obtain the first layered product, and in that the method further comprises the step of depositing in a deposition area, by using a material providing device, a layer of construction material onto a second building platform for building a third layered product before the first layered product has been removed.

An advantage of moving the building platform relative to the conveyor in order to adjust the distance between the material providing device and the building platform is that the material providing device need not to be moved and therefore can be placed at a fixed position. Keeping the material providing device at a fixed position has the effect that there is no need for stopping the deposition process during adjustment of the distance between the device and a platform onto which material has to be deposited. As a consequence there is more time available for depositing material and therefore the device can be used more efficiently.

An advantage of moving the building platform so as to pass the material providing device repeatedly is that subsequent layers of the same material can be deposited with the same material providing device. Passing a material providing device repeatedly has the effect that the number of such devices for making tangible products can be limited compared to a method wherein each layer is deposited by a separate deposition device. The use of only one or a limited number of deposition devices makes the method more costs efficient than a method in which a building platform passes a deposition device only once.

An advantage of depositing construction material onto a second building platform while the first layered product is still being constructed is that multiple products are made quasi simultaneously. The effect of this quasi simultaneous production is that more products can be made in a certain time span. Consequently, a more efficient production method is obtained.

Another objective of the present invention is to provide a production line for additive manufacturing of tangible products, which production line allows rapid manufacturing of mutually different products.

This objective of the invention is obtained by a production line for layerwise manufacturing of tangible products comprising a first building platform (102) for carrying a tangible product, a deposition head (101) for providing a layer of construction material onto the first building platform, a conveyor (103) for conveying the first building platform in a conveying plane, height adjustment means for adjusting the distance between the deposition head and the first building platform, characterised in that the conveyor is a conveyor for conveying (105) the first building platform towards the deposition head and away from the deposition head repeatedly, and the height adjustment means (107) are configured for displacing (104) the first building platform relative to the conveyor in a direction perpendicular to the conveying plane, and in that the production line further comprises a second building platform for receiving said material, which second building platform is conveyable by said conveyor and which second building platform is displaceable relative to the conveyor independent from the first building platform.

An advantage of a conveyor for conveying the platform towards the deposition head and away from the deposition head repeatedly, is that each platform can pass a single deposition head several times. The effect of passing a single deposition head several times is that only a limited number of deposition heads, possibly only one deposition head is required for making a tangible product. A production line comprising only a limited number of deposition heads will cost less than a production line in which each layer is deposited by a separate deposition head.

An advantage of the height adjustment means being configured for displacing the building platform relative to the conveyor in a direction perpendicular to the conveying plane, is that the deposition head may be placed at a fixed position and that the distance between the deposition head and the building platform can be adjusted when the building platform is removed from the deposition area, viz. away from the deposition head. The effect is that the deposition head can be used to make another product during the time that the height of the building platform is being adjusted. This allows a more efficient use of the deposition head during the layerwise manufacturing of tangible products.

An advantage of a second building platform for receiving the material is that a second product, that may be different from the first product, can be made simultaneously with the first product. This makes the production line more efficient.

BRIEF DESCRIPTION OF THE FIGURES

FIG. 10 is a schematic drawing of height adjustments means for adjusting the height of a platform

DETAILED DESCRIPTION OF THE INVENTION

Figure 1:
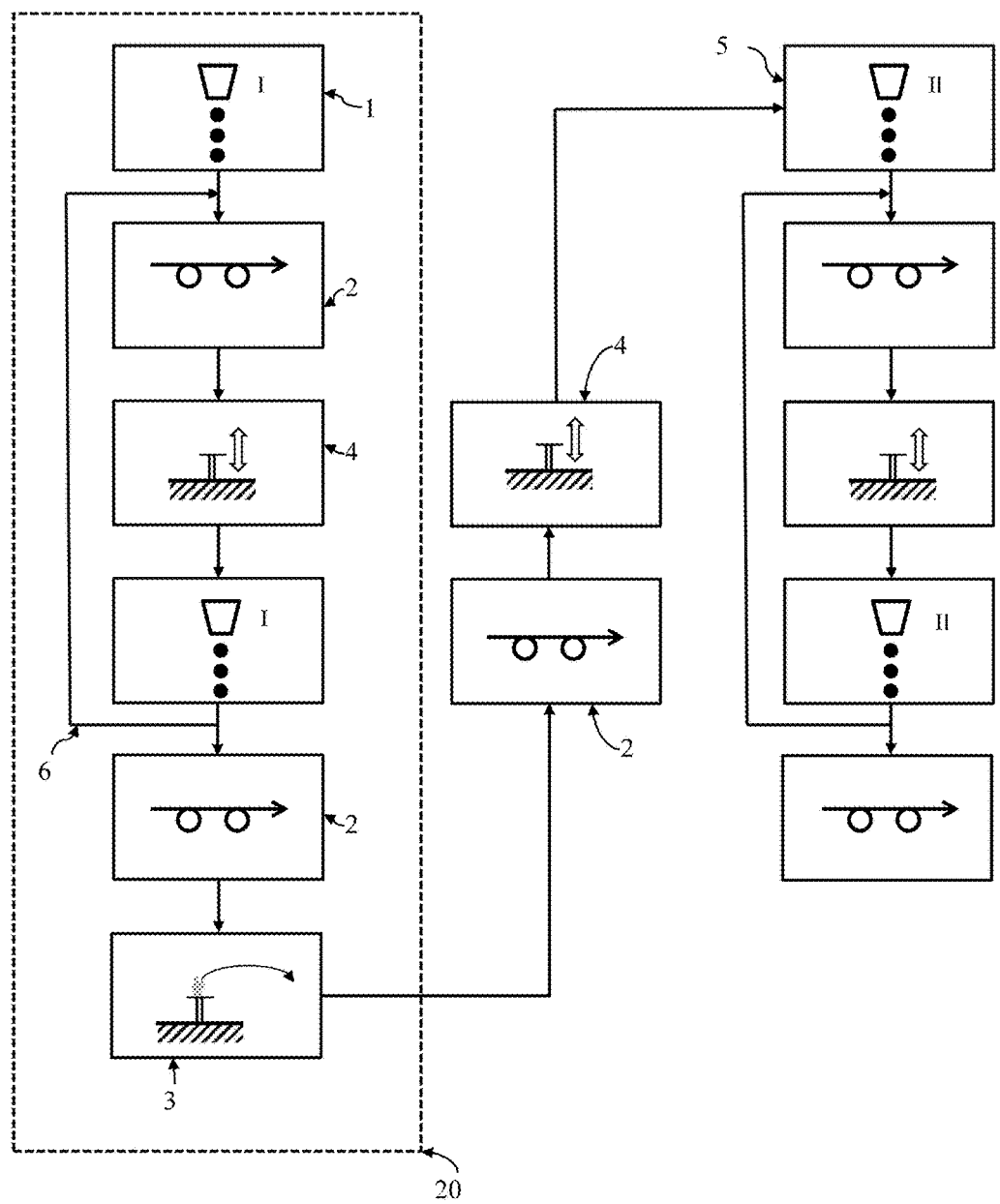
FIG. 1 is a flow diagram illustrating an embodiment of the method for making several tangible products according to the invention.

A preferred embodiment of the method for making several tangible products according to the invention will be discussed with reference to the flow diagram of FIG. 1. For manufacturing of a layered product a suitable material has to be provided layerwise. This step (1) of providing construction material layerwise by a material providing device onto a building platform to obtain a first product, may comprise a number of preliminary activities. One of these activities is to tune the deposition technology and the materials to be used. If a certain material providing device or technology is preferred for the layerwise manufacturing, then a suitable construction material has to be found. Likewise, a proper material providing device or technology has to be found if a certain material or class of materials is preferred. A proper material providing device may be an inkjet printing head suitable for an ink that can be used for layerwise manufacturing. Examples of such inks are solvent based inks comprising a polymer solution or inks comprising a curable resin. Advantageous are resins that are curable by electromagnetic radiation, in particular light. Often, resins that are curable by ultraviolet light are preferred because they can be applied under normal environmental condition, viz. visible light, without being cured unwanted. UV curable resins have the advantage that they will not block a nozzle where other inks do so due to solidification, viz. drying, of the ink by evaporation of the solvent. Further, UV curable inks often have a long shelf life. A suitable ink may be a dispersion of solid particles in a liquid polymer solution or curable resin. The particles may be metallic particles that eventually can be sintered after the solvent has evaporated or after the resin is cured.

Because using a printing head is a preferred embodiment for providing the construction material, in the following the word deposition head will be used frequently. It is appreciated, however, that the use of this word is not intended to limited the invention to any specific material providing device or technology. A deposition head is any kind of device that is suitable for depositing a material on the building platform, on a previously deposited layer carried by the platform, or on a substrate or other object or product carried by the building platform. So it includes also atomic layer deposition, a technique that can be used to apply thin layers of specific materials.

Where in the following reference is made to the deposition of a material onto a building platform or of placing an object on the platform, this includes the deposition and placing on the platform itself, on a substrate or object or product carried by the platform, and on previously deposited layers.

When reference is made to a product made by layerwise manufacturing on a building platform, it is appreciated that this includes the situation in which the building platform carries several products. The several products on a single building platform may have the same geometry or different geometries. Because such separate products are located on the same building platform, they will have a certain resemblance, more in particular a similar layered structure.

After the first layer of the construction material has been deposited on the building platform, the deposited layer is transported away (2) from the deposition head by the conveyor that conveys the platform on which the layer is deposited.

For accurate manufacturing, the distance between the deposition head and the target area, which is the area on which the material is deposited, may need to be the same for all layers during the deposition of the material. For the first layer this will be the building platform or a substrate. For subsequent layers the target area is defined by the preceding layer, which preceding layer may comprise a solidified layer and supporting parts as will be discussed later. The target area may also be an object that has been inserted to be encapsulated, which object may be produced by layerwise manufacturing or otherwise. In order to keep the distance between the deposition head and the target area constant, the platform can be displaced (4) relative to the conveyor in a direction that is parallel to the building direction. Usually this will be the vertical direction.

After having adjusted the height of the platform, a new layer can be deposited on top of the previously deposited layer. The process of depositing a layer, moving it away from the deposition head, displacing the platform relative to the conveyor in a downward direction, and providing the layer to the same deposition head again, is repeated (6) until the product is finished. The method can favourably be applied by moving the conveyor fast, in particular with a speed of 1 m/s or faster, for example 2 m/s. Typically the platform may pass a material providing device at least every 10 seconds, for example every 5 seconds or even every 1 second. During moving the layer, the layer can for example be cured or machined or another deposition head may deposit another or the same material.

Although it may be preferred to adjust the distance between the deposition head and the target area after deposition of each layer, it may be sufficient to adjust the height of the platform not after the deposition of each layer, but only when a few layers have been deposited, for example five layers. However, in case that the height is not adjusted after depositing each layer, the timing of the deposition head may need adjustment because of the following. The material needs some time to reach the deposition area after being ejected by the deposition head. During this time, the building platform will move and consequently the position where the droplet of the material will reach the deposition area will change when the distance between deposition head and the deposition area changes.

As mentioned above, the displacement of the platform after depositing a layer or before depositing an additional layer, will usually be downwards. If, however, for example another type of material has to be deposited on top of the previously deposited layer, than, possibly, the distance between the depositing head and the building platform needs to be smaller. In such a case, the platform will be displaced upwards. In other situations, the platform may not need to be displaced at all, for example because the subsequent layer is to be deposited in the same building plane at positions where there is no material of the previously deposited layer. Apart from the case where holes in a previous layer have to be filled, a subsequent layer may also be deposited into the previous layer, so injecting the previous layer with another material.

After the product is finished, it is removed (3) from the building platform. This removal may for example be realized by picking up the product from the platform or by transferring the substrate on which the product is built, from the platform. After the product is removed, the platform is available for the manufacturing of a second product. The height of the empty building platform is adjusted (4) as to provide the proper distance between the building platform and the deposition head for depositing the first layer of the second product. The platform is moved (2) towards the deposition head for receiving the first layer of the second product (5), either before adjusting its height, after adjusting, or during adjusting. This second product is produced in a similar way as the first product, so that in fact the production process (20) is repeated. This second product need not be the same as previous product, although it may be the same, because the shape and composition of the layers can be determined for each individual layer. Although the word second is used here, the word should not be interpreted in its literal sense. Actually, the second product may be any subsequent product.

Figure 2:
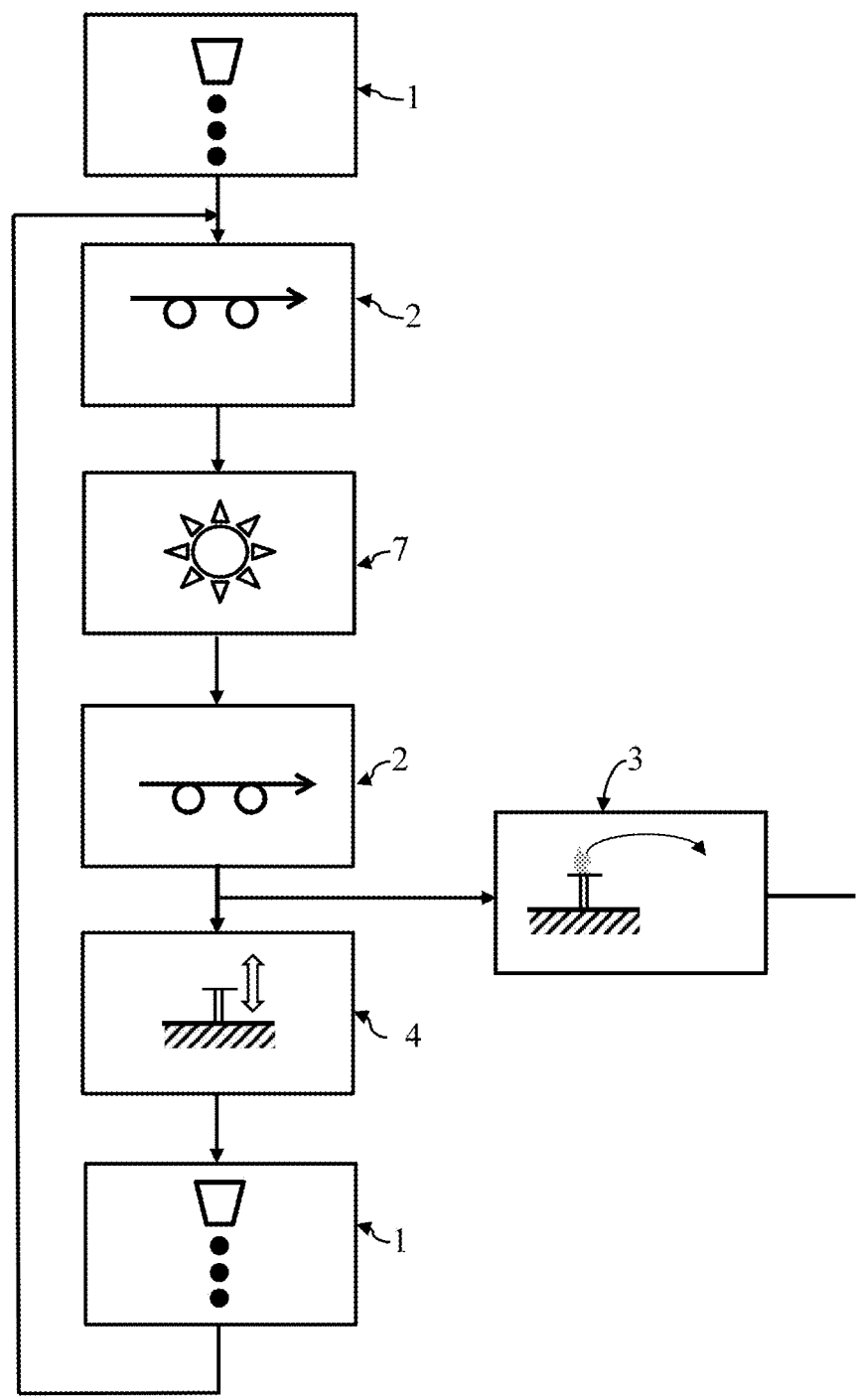
FIG. 2 is a flow diagram illustrating an embodiment of the method comprising a step of solidification.

Another embodiment of the method is discussed with reference to FIG. 2. In this figure only the production process for one product is shown. So this figure may replace the method steps within the box (20) in FIG. 1. This other embodiment of the method for making tangible products by layerwise manufacturing comprises a step (7) of solidifying the construction material in a predefined pattern after the construction material is provided to the building platform. Although it is possible to deposit construction material that solidifies in a predefined pattern without further measures, for example because the solvent of the ink evaporates fast or because the two-component ink solidifies in short time, many construction materials as deposited require an additional solidification step. In case that the construction material has been deposited in a layer of the required shape, the solidifying step can for example be a heating of the layer or a curing by electromagnetic radiation, for example UV light. Because the layer of construction material has already the required shape, the solidification means have not to be provided in a pattern but may be provided homogenously over the whole target area or even a larger area. This allows for example thermal heating by infrared radiation or heating by hot air.

In case that the deposited layer is a continuous layer of construction material, this layer has to be solidified in the required shape by solidification means that are provided locally. In case that the construction material has to be solidified with electromagnetic radiation, for example UV light, this radiation can be provided locally in several ways. For example a mask, preferably a programmable mask, can be used to subject a predefined part of the layer to the radiation. Instead of a mask a matrix with individually addressable light sources, for example light emitting diodes, can be used. Another way of providing light in the required pattern is a scanning laser or moving mirrors for directing the light in the proper direction.

Preferably, the method is performed with equipment comprising several platforms because than the advantages of this method are exploited optimally. In case that several platforms are used for implementing the method, the steps may be similar to those described above, replacing the word platform by the $n^{th}$ platform, where n is the sequential number of the platform. However, the method according to the invention does not require that all the platforms are used for the manufacturing of a layered product. For example some of the platforms may be kept empty. Neither is it required that the removal of the products is performed in the sequence of the arrangement of the platforms. Actually, the method can be applied while operating each of the platforms independently of all others.

Figure 3:
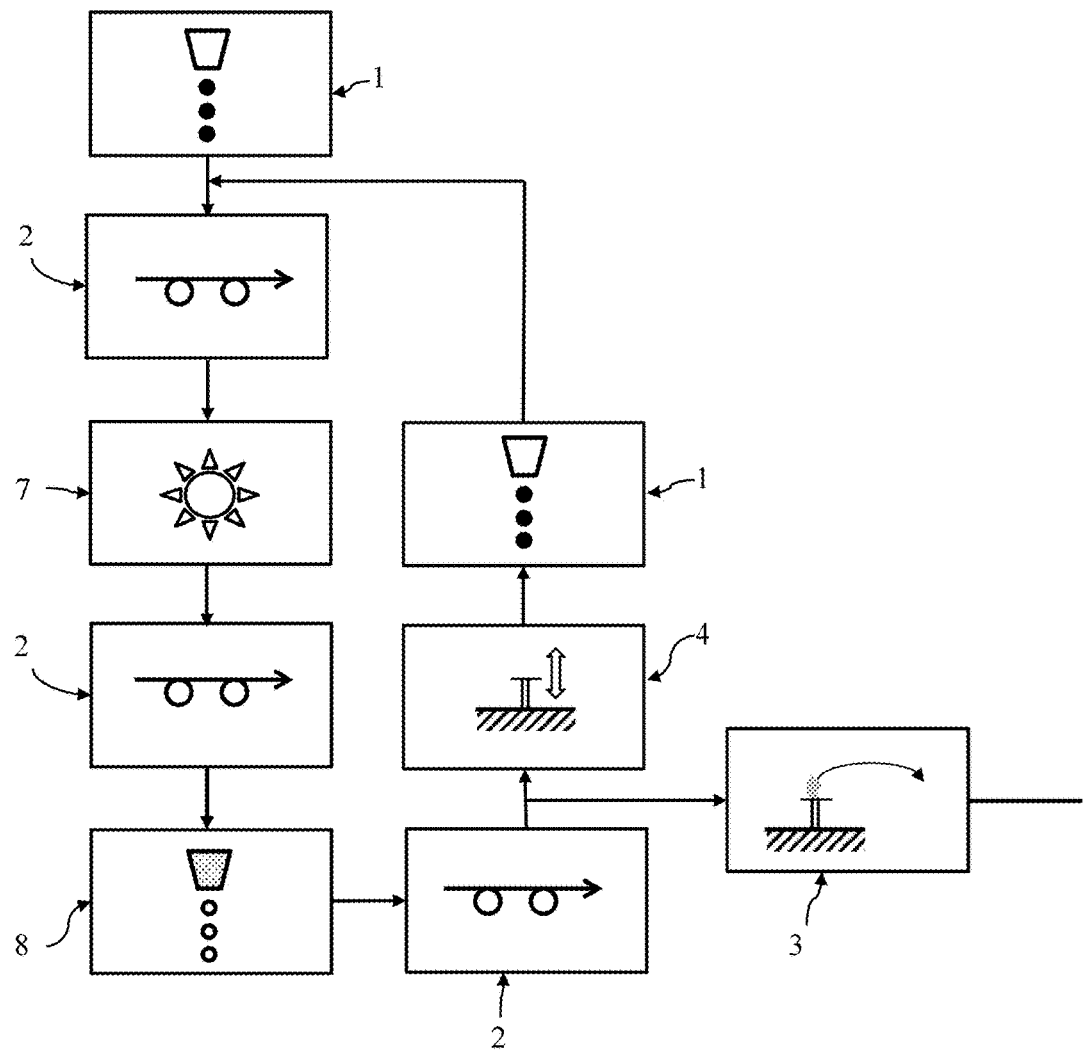
FIG. 3 is a flow diagram illustrating an embodiment of the method comprising providing a supporting material.

Another embodiment of the method, shown in FIG. 3, comprises a step (8) of providing a supporting material for supporting construction material. This embodiment is discussed here with reference to FIG. 3. Here again, only a part of the method steps are shown, namely the steps for one product. The embodiment of the method is in particular of interest for making products in which parts of subsequent layers are not supported by an underlying, previously deposited layer, for example in case that the product comprises holes or overhanging parts. In certain embodiments of the method, the non-solidified part of the construction material can fulfil the function of supporting material, for example when the construction material is a powder with a certain degree of coherency. Using the construction material as supporting material has several disadvantages. One of the disadvantages is that the construction materials, which are developed for layerwise manufacturing, often are rather expensive. Sometimes the not-solidified construction material can be reused, but this requires special measures such as cleaning. An advantage of using a different material for supporting is that the supporting material can be selected from a class of materials with properties that make them especially suitable for supporting. In particular materials that can easily be removed from the product, for example by solving them in solvents that are not detrimental to the construction material, like water.

According to the method steps shown in FIG. 3, the construction material provided in step (1) is solidified in a separate step (7). However, such a step may be absent in case that construction material is for example a two component systems that solidifies without a special step. More in particular such a two component construction material may solidify as a result of its exposure to normal environmental conditions. Although not shown in FIG. 3, the supporting material may be subject to a solidification process, which solidification may of course not prevent later removal of the material if required. Usually, the supporting material should be removable after the product is finished. However, for special products it might be acceptable that the supporting material remains in the product. For example if the supporting material is a lightweight material not visible from the outside of the finished product.

The supporting material can be deposited either after a layer of construction material has been deposited in the predefined shape or before. Because the spaces filled with the construction material and the supporting material are complementary, they may form a continuous layer of which a part will be solidified, viz. the part being the construction material. The layer as whole, viz. the solidified part and the part composed of supporting material, is the basis on which a subsequent layer can be deposited.

A supporting structure can also be obtained from the construction material or from a —different—construction material that is solidified. Such a supporting structure may for example have a honeycomb geometry or other type of structure that can easily be broken apart later.

Figure 4:
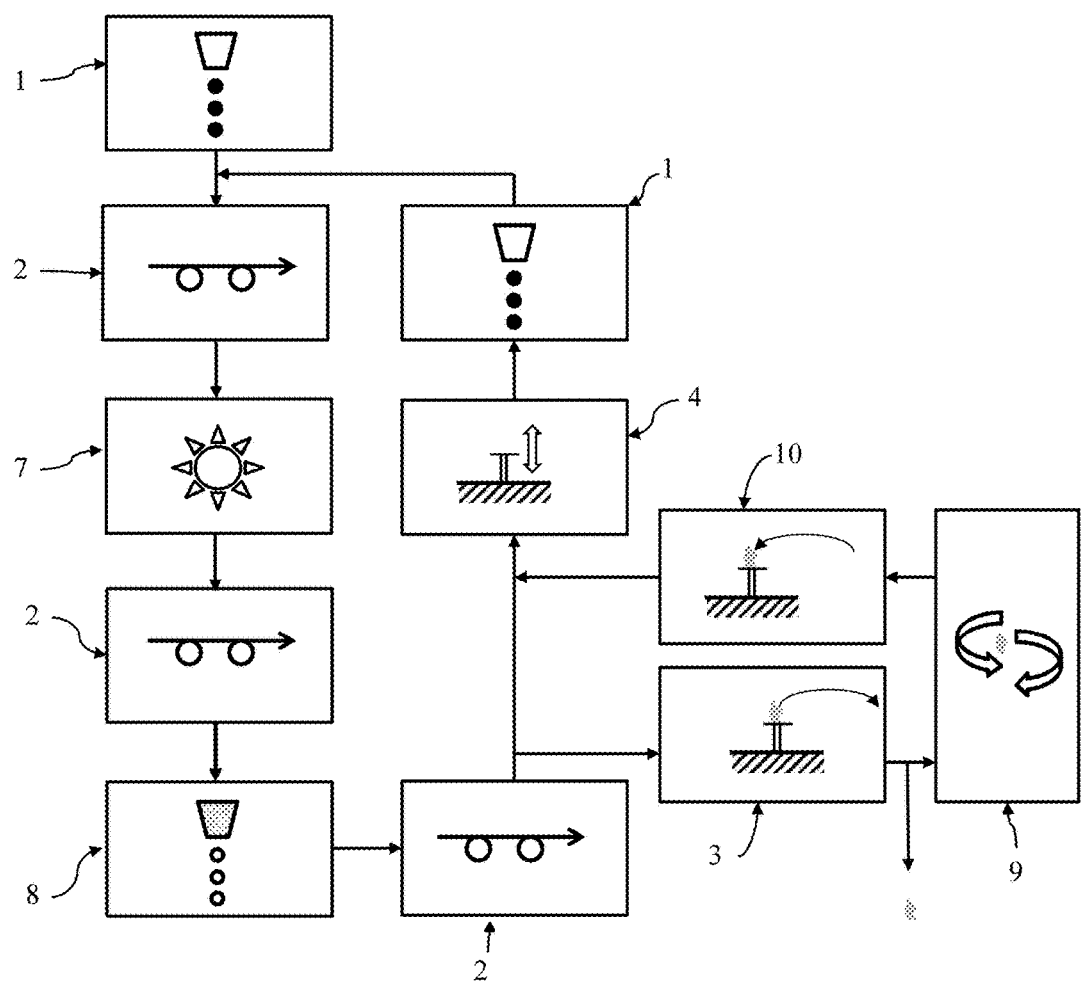
FIG. 4 is a flow diagram illustrating an embodiment of the method comprising further processing and replacing the product.

In a further embodiment of the method is shown in FIG. 4. This embodiment comprises the step of further processing (9) the first product after it has been removed from the building platform. This embodiment further comprises the step of placing (10) this processed first product back to a building platform conveyed by the conveyor. This embodiment is based on the insight that many products that are manufactured layerwise need further processing as an intermediate step between two steps of layerwise manufacturing. Such further processing may be for example a surface treatment. Examples of surface treatments are removal of material, for example by etching or mechanical tooling like polishing. The surface treatment may also be the addition of material, for example by painting, thermal evaporation, electrochemical deposition or other atomic layer deposition techniques. The further processing may also comprise adding or inserting electronic components like for example computer chips and light emitting diodes. It may also comprise the insertion of certain products that can better made by other techniques than layerwise manufacturing, like for example photovoltaic cells, MEMS devices or injection moulded parts.

In particular such outside processing is advantageous if such processing is not compatible with the speed of layerwise manufacturing, viz. the speed of the conveyor. It is in particular advantageous if the processing is a batch process that requires special equipment, like for example electroless plating, spark erosion or laser drilling.

In the embodiment of the method comprising the step of further processing the product, the product may be placed back on another building platform than the one from which it was removed. This may for example be the case when the second product is still on the building platform. In an embodiment of the method comprising further processing of the product, the processed product is placed on the same platform as from which it was removed. According to this embodiment, the second product is removed from the building platform before the processed first product is replaced. When a complex product has to be manufactured comprising both the first and the second product, the first product may be placed on the same building platform, so either on top of the second product or aside. For this purpose, the method may comprise a step of providing a machine readable code, for example a barcode or QR code, to the platform, the substrate or the product. Such a method further may comprise a step of reading the code and determining what the next processing step is for the product.

Layerwise manufacturing is an additive process in which material is added to earlier deposited material. However, products made by such a process may need to be tooled, for example by milling, drilling, or smoothening by polishing. The process of layerwise manufacturing may result in an accumulation of errors, for example in the thickness, viz. height, of the product. For these and other reasons sometimes material has to be removed from the already deposited layers or product. Such a removal may take place outside the deposition equipment, viz. away from the conveyor, as described above. However, in particular when adjustment of the thickness is required due to imperfections due for example replacing on the building platform or the vertical displacements of the building platform, the removal of the material has to be or may be performed while the product is on the building platform. Therefore, the method may comprise a step of removing material from the product while said product is attached to the platform.

Products made by layerwise manufacturing may be combined with other objects to obtain a compound product. Such other objects may be electrical, optical, magnetic or mechanical functional devices. Examples of such functional devices are computer chips, light emitting diodes, lens systems, actuators, piezoelectric elements, loudspeakers, microphones, and batteries. Such a functional object may be joined with the product after the layerwise manufacturing is completed. However, in particular when the object has to be encapsulated or otherwise integrated with the product, the object has to be placed during the layerwise manufacturing. In an embodiment of the invention, the method comprises the step of joining an object with the layerwise manufactured product by placing the object on the building platform. The object may be placed directly on the platform before starting the layerwise deposition. The object may also be placed after one or more layers have been deposited. The object may even be placed after all layers have been deposited.

Another embodiment of the invention is a production line for layerwise manufacturing of tangible products. Such a production line will be discussed here with reference to the embodiment of the production line shown in FIG. 5. The basis of the production line (100) is a conveyor (103) for conveying the building platform in a conveying plane. A conveying plane is a plane in which the platforms moves when it is conveyed. The building platform may be conveyed in an alternating way between two outer positions at which the platform turns back. However, an endless conveyor, which may for example be a disc or an endless belt, is a preferred conveyor for conveying a building platform towards a deposition head and away from the deposition head. An advantage of an endless conveyor is that, in use, the building platform may approach a deposition head from the same side when the conveyor moves unidirectional. Another advantage is that an endless conveyor makes it easier to use multiple platforms. Preferably, such a conveyor is configured as to convey products in a horizontal plane, viz. in a plane that is perpendicular to the gravitational force. An advantage of a horizontal endless conveyor is that the direction of gravitational force to which the products on the endless conveyor are subjected, does not change even during a continuous unidirectional movement of the conveyor. So, the gravitational force is in the same direction everywhere on the conveyor. Consequently, powders and even liquids can be deposited on the conveyor without falling off at another position of the conveyor.

Around this conveyor, equipment such as a material deposition head (101) is positioned for the layerwise manufacturing of products. The inventors have found that an endless conveyor is very well suited for layerwise manufacturing because a position on such a conveyor passes a fixed external point several times. This allows processes, like deposition of a layer, to be performed repeatedly without requiring special measures. For products that are made out of one material, just one deposition head may be sufficient to make the product when an endless conveyor is used. In systems like the one disclosed in US patent application US200910076643 many printing heads, or even a huge number of printing heads are needed, namely at least one printing head per layer.

Figure 5:
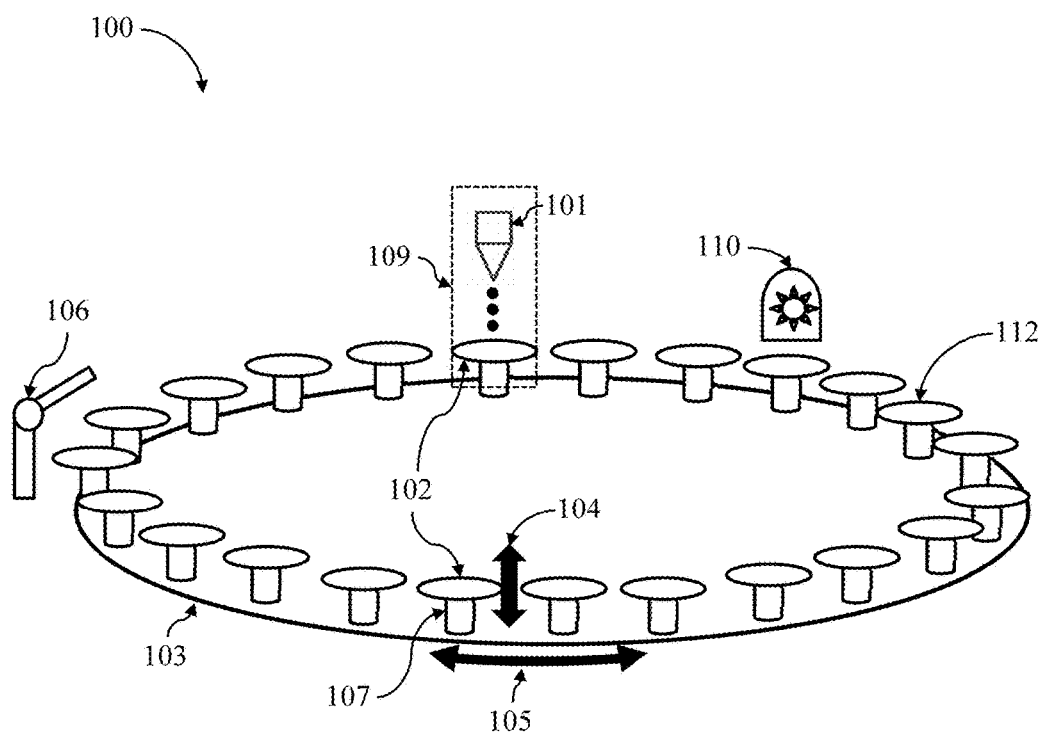
FIG. 5 is a schematic drawing of a production line for additive manufacturing according to the invention.

The conveyor may for example be a rotatable disc as shown in FIG. 5, but preferably it is a conveyor belt, more in particular and endless conveyor belt. An endless conveyor belt can be configured in a geometrical shape that allows optimal use of available space and it allows conveying the products along or even through all types of equipment, like for example deposition, tooling, and heating equipment. If the trajectory of the platform is curved, as is the case for a rotating disc or at parts of a conveyor belt, then there is a difference in the length of the trajectory at the inner curve and at the outer curve. Compensating for this difference by adjusting the deposition of the material may be cumbersome. For this reason a conveyor belt comprising straight parts is preferred.

As shown in FIG. 5, the production line comprises a deposition head (101) for providing a material from which the product has to be made. The deposition head can be any type of material providing device arranged to deposit material layerwise on a building platform. The deposition head may be of a type that provides a continuous layer of material, for example a spray gun or a coating curtain. Preferably the deposition head is a printing head providing droplets of material to the building platform, for example an inkjet printing device. Such a droplet providing device may be a continuous inkjet device which ejects droplets continuously in time or a droplet on demand device. The deposition head may also be a powder dispenser. The deposition head may be a scanning deposition head that can move in such a way that material can be deposited on different places of the building platform. Preferably, such a scanning deposition device allows a beam of material to be directed towards the different positions on a building platform with a scanning speed that is much higher than the conveyor speed. Such scanning device allows making complex patterns while the building platform is moving. Typically, the deposition head may be suited to deposit layers of a thickness between 1 micrometer (μm) and 1 millimeter (mm), more in particular between 5 micrometer and 500 micrometer, or even more particular between 10 micrometer and 200 micrometer. The inventors advantageously deposited layers of a thickness between 30 micrometer and 80 micrometer. The invention is, however, not limited to such layer thicknesses. Layer thicknesses of less than 1 micrometer (μm) are feasible, for example by deposition techniques like atomic layer deposition. Because such a small layer thicknesses will require a huge number of layers to obtain a product with macroscopic dimensions, such thin layers may in particular be of interest for the addition of layers to semi-finished products or as a functional layer in or on the product. The layer thicknesses may be larger than 1 millimeter (mm), but products composed of such layers have a very rough structure and therefore usually will require additional processing, for example polishing. Further, the solidification of such thick layers may be cumbersome.

To allow manufacturing products with detailed structures, the lateral resolution of the deposition process should be high. Among others, this lateral resolution is determined by the type of deposition head. In embodiments where a continuous layer is deposited which is solidified by for example electromagnetic radiation, more in particular UV light, the resolution may be lower than 10 micrometer or even lower than 1 micrometer. When the two-dimensional structure is determined by a printing process, the resolution may be lower than 100 micrometer, or more in particular lower than 10 micrometer. It is appreciated that not all the deposition heads of the production line need to have the same resolution. The type of deposition head, the material to be deposited and the functionality of the deposited layer in the product to be fabricated will, among other parameters, determine what resolution is required and feasible.

Figure 6:
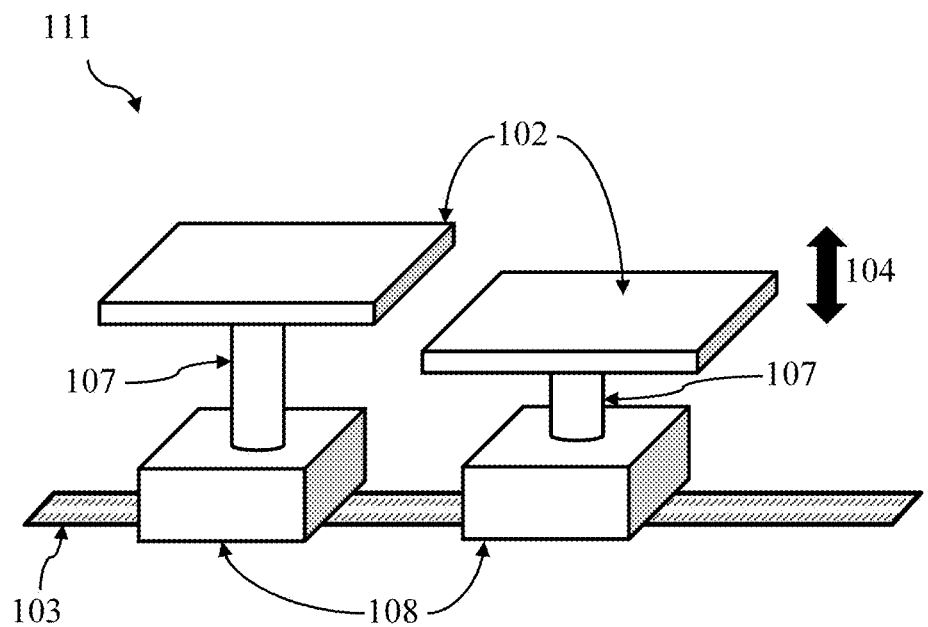
FIG. 6 is a schematic drawing of an embodiment of a carrier comprising a building platform.
Figure 7:
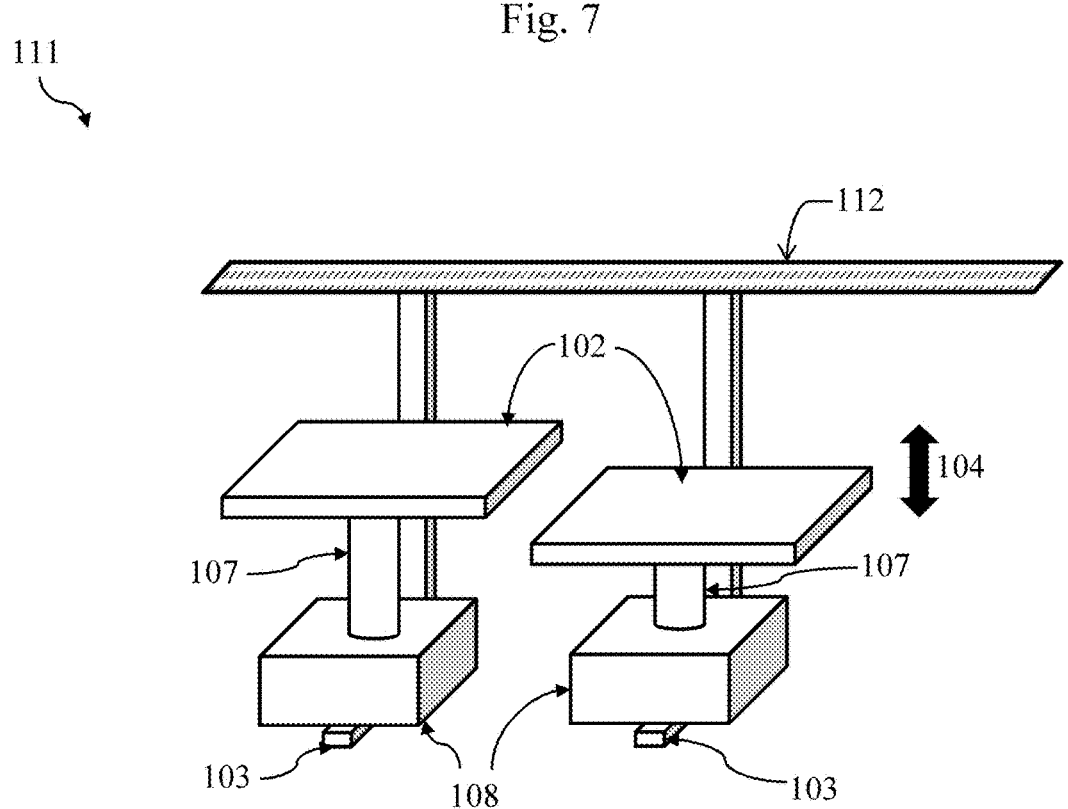
FIG. 7 is a schematic drawing of another embodiment of a carrier comprising a building platform.

The production line comprises one or more building platforms (102) for carrying layers of material during the manufacturing of a product as shown in the FIGS. 6 and 7. The platforms are displaceable (104) relative to the conveyor (103) in the building direction. So, in this embodiment the building platforms can be displaced around their middle vertical position both upwards and downwards, viz. away from the conveyor and towards the conveyor. In a preferred embodiment as shown in FIG. 6, the conveyor (103) is mainly situated below the platform (102). However, as shown in FIG. 7, a part of the conveyor may be situated above the platform. In the embodiment of FIG. 7, the conveyor (103) is mechanically attached to a transporting belt or cable (112), which transporting belt or cable is driven by a machinery, for example an electromotor.

Returning to the embodiment shown in FIG. 5, other aspects of the apparatus will be discussed. During use of the production line, the conveyor will move the building platform to and from the deposition area (109) in such a way that the building platform will be situated between the deposition head and the conveyor at regular time intervals when the platform and the deposition head are in the deposition area. In a preferred embodiment of the production line, the deposition head (101) is fixed at a position relative to the floor on which the apparatus is placed, in such a way that material falls or is ejected in the direction of a building platform that is situated below the deposition head. During a selected time interval, the building platform will receive the material. After a layer has been deposited, the platform can be moved downwards to keep the distance between the deposition head and the target area of the material constant, viz. to have the same distance between the top of the already deposited layers and the deposition head each time the platform passes the deposition head. If the distance between the deposition head and the target area is not very critical, the height of the platform need not to be adjusted before every passage. In such a case the height can be adjusted after a few layers have been deposited. However, as mentioned before, when the platforms move at a high speed, the distance between deposition head and target area is very critical. If the deposition line comprises more than one deposition head or if it comprises in addition to the deposition head another type of device, the height of the platform may be adjusted before the building platform approaches such other deposition head or second device. Such an adjustment need not be a lowering but may also be a movement in the upwards direction, for example because the device is a cutting knife or a polishing device.

The distance between the deposition head and the target area could also be adjusted by displacing the deposition head. However, such a construction has the disadvantage that the deposition head has to move to its new position in a very short time, namely the time that it takes to move the platforms over a distance that is equal to the spacing of two platform in the conveying direction. For a typical conveying speed of 2 m/s and a spacing between two platforms of a centimeter, the time interval is only 5 ms. The time that is available for displacing the platform is much larger. For a conveyors in which the trajectory of the platforms is for example 6 meters, the available time is about 3 seconds, which is a factor of 600 longer.

The height adjustment means and the building platform may be directly placed or on or attached to the conveyor as is shown schematically in FIG. 5. However, in particular when the conveyor is a conveyor belt, a different construction as shown in FIG. 6, is preferred. FIG. 6 shows two carriers (111) comprising a building platform (102) and a carrier basis (108), which carrier basis is attached to the conveyor (103) in such a way that the conveyor transports the carrier when the conveyor moves. Preferably, each platform carrier has its own height adjustment means (107) allowing each building platform to move relative to the conveyor in the building direction (104), independent from the other platforms and independent from the actual position of the platform. Independent does not only mean that the height of a platform may be different form a neighbouring platform but also that the height is not related to the height of a neighbouring platform. For example, the heights of subsequent platforms need not increase or decrease with the distance to each other but may be distributed at random. An advantage of such independent platforms is that there is a large degree of freedom in making different products quasi-simultaneously. The level adjustment means may be mechanical, for example using an electromotor and a worm wheel or a stepping motor. The height may also be adjusted by for example a piezoelectric actuator. FIG. 7 shows an alternative embodiment of the construction for conveying the platform. Also in this embodiment the carrier basis is attached to a conveyor (103). However, in this embodiment the conveyor is attached in a hanging geometry to a conveyor belt or cable (112).

The height of the building platforms may also be adjusted at one or more fixed positions along the endless conveyor by a tuneable height adjustment device. A preferred embodiment of such a height adjustment device is shown schematically in FIG. 10. FIG. 10A is a top view and FIG. 10B is a side view of a part of the apparatus. FIG. 10 shows four platforms (311,312,313,314) that can be moved by a conveyor (103) in a conveying direction (401). Where in the following description reference is made to only one platform (311) and its height adjustment means, such a description relates also for the other platforms and their height adjustment means. However, although it is preferred to have identical or nearly identical carriers, this need not to be the case. The platform (311) is placed on a carrier basis (351), which carrier basis is attached to the conveyor (103). The carrier basis comprises a connector (361) that allows that the carrier basis can be pushed upwards (404) while moving in the conveying direction (401). FIG. 10 further shows a ramp (321), which ramp may be fixed to the frame of the apparatus or the ground or floor (381). It is preferred that the ramp can be adjusted in the vertical direction (403) for example by an electromotor or an actuator (371) that can displace the ramp in vertical direction. The carrier basis comprises a wheel (341) that allows the carrier basis to be moved upwards when following the slope of the ramp. A wheel is preferred because this allows moving with hardly any friction, but other guiding means may also satisfy. In this embodiment the slope must be upwards in the moving direction. It is appreciated that the ramp may be symmetric with respect to the line (410) to allow moving of the conveyor in both directions, so in the direction of the arrow (401) and in the opposite direction. Preferably the ramp is used for large vertical displacement of the carrier. So, a ramp will be situated at positions in the apparatus where the deposition head or a tooling device requires that the platform is moved at relatively large vertical distance. In general, the carrier comprises an actuator (331) for moving the platform accurately in vertical direction (402) relative to the carrier basis.

Although all the carriers may be similar in construction, it is preferred that the position of the wheel (341) is not the same for all the carriers as will be explained here. The ramp is in particular suited for making large movements. Due to a large conveying speed of the carriers and the small distance between the carriers, it will be very difficult to move two neighbouring carriers to different heights because this would require huge accelerations. To solve this problem, the apparatus may comprise multiple ramps in parallel as shown in FIG. 10A. Here the number of ramps (321,322,323) is three, but it will be appreciated that a larger number of ramps, for example five, may be preferred and that a lower number may satisfy. Each of the wheels (341,342,343,344) of the subsequent platforms (311,312,313,314) is displaced vertically, that is perpendicular to the moving direction, relative to the wheel of its neighbouring carrier in such a way that the wheels follow different ramps. So, wheel (341) will follow ramp (321), wheel (342) will follow ramp (322), wheel (343) will follow ramp (343), and wheel (344) has followed ramp (322). Because the height of the ramps can be adjusted independent from the others, the height of neighbouring carries basis and thus the platforms can different. In the embodiment of FIG. 10, each third platform (312,314) uses the same ramp (322). Depending on the length of the ramp relative to the distance of the wheels in the conveying direction (401), the conveying speed, the required adjustment of the height of the carrier, a larger number of ramps may be preferred. In particular five ramps and five corresponding vertical positions of the wheels seem be a favourable embodiment. The embodiment of the apparatus comprising several ramps as described above, provides a large degree of freedom in making different product on neighbouring platforms.

The production line as shown in FIG. 5, further comprises a picking unit (106) for picking a manufactured product from the building platform. An advantage of a picking unit for picking a manufactured product from the building platform is that when a product is finished it can be taken from the building platform automatically. The effect of taking a product automatically from the building platform is that there is no need to have a person available for picking the product when it is finished. Preferably the picking unit allows the product to be picked while the conveyor is moving and thus the manufacturing of other products is not delayed. This can be realised for example by moving the picking unit during the picking time with the same velocity as the building platform parallel to the conveyor. Those skilled in the art will be familiar with different types of picking units, like for example robot arms. The picking unit may also be suitable to place a product on the building platform. Such a product may be a previously manufactured layered product or it may be for example a device with specific mechanical, electrical, or optical functionality. However, the picking unit and placing unit may be separate units.

The production line may comprise a curing device (110) for curing a layer of construction material to obtain a patterned solidified and coherent layer corresponding to a cross section of the product to be manufactured. Such a curing device may be a device providing electromagnetic radiation, for example ultraviolet light. Preferably, such a UV source can provide the UV radiation in a predefined patter, for example by means of a scanning laser or an array of small UV sources, like for example light emitting diodes. However, in some embodiments of the production line, the curing device may provide a more or less homogeneous curing condition along the whole area of the layer. Such a homogeneous source, for example a UV lamp, can be applied for after curing of a pre-cured layer. It may also be applied if the layer is composed of two types of materials; the curable construction material and a supporting material that is not cured under these conditions.

Preferably, the production line comprises two or more building platforms. Such several building platform allow that the advantages of the production line can be exploited even better. During use of a production line comprising several building platforms, there may be products in different stage of construction on the conveyor resulting in very flexible production. Several platforms may also be advantageously when for example the step of picking the product from the building requires relatively much time, more in particular requires that the conveyor is slowed down. In such a case one may prefer to make products on the different platforms and after the last product is finished, slow down the conveyor to pick the products form the building platforms.

To obtain a flexible production line that allows producing different products and to produce products at different stages of production simultaneously, the different platforms may be displaceable independent of each other in the building direction relative to the conveyor.

Figure 8:
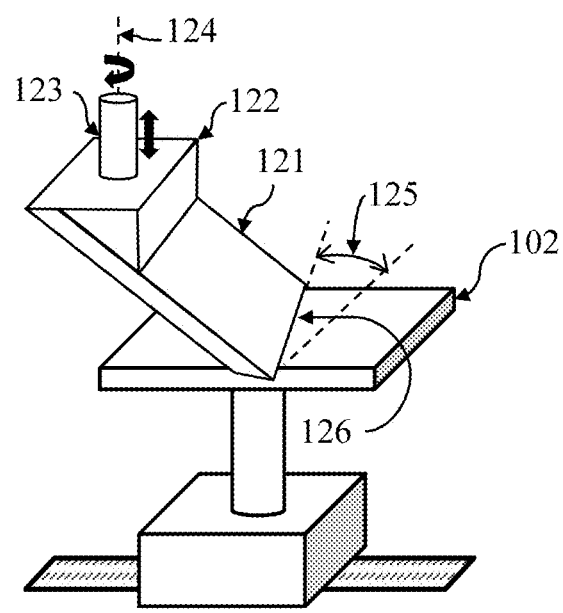
FIG. 8 is a schematic drawing of an embodiment of a cutting device.

During additive manufacturing, layers are deposited on top of each other. This may result in an accumulation of errors in the thickness. Also picking of a semi-finished product an replacing it on a platform may introduce errors. For this and other reasons it may be advantageous to have the possibility to adjust the height of a product. If the height during a certain stage of the fabrication is too low, an additional layer can be deposited. If, however, the product is too high, some material has to be removed. To allow such a removal the production line may comprise a cutting unit for removing material from the already manufactured product. Such a cutting unit may comprise a knife that is adjusted such as to remove a slice of the solidified material. Due to the fact that the apparatus allows fast movement of the platforms and thus of the products relative to the knife, typically the speed can be up to several meters per second, such a cutting may be favourable applied. An embodiment of such a cutting unit is shown in FIG. 8. The unit comprises a knife (121) that is attached to the apparatus by a stage (122, 123) that allows the knife to be positioned. The stage is configured as to move the knife in the vertical direction in order to adjust the height of the knife with respect to the platform (102). Preferably, the knife can be rotated along a vertical axis (124) in order to vary the in-plane angle (125) between the cutting edge (126) of the knife and the platform.

The invention is not limited to specific dimensions or technical specifications of the production line and its elements. The building platforms may have a rectangular area which is typically less than 400 mm×200 mm, more particular less than 200 mm×200 mm, or less than 100×200 mm, or even more particular less than 100 mm×50 mm. The inventors preferred a building area of 50 mm×75 mm. However, the deposition area may also be larger than 400 mm×200 mm. The building platform need not to be rectangular, but may for example also be elliptical, or more specific round as shown in FIG. 1. An advantage of a rectangular platform is the optimal use of space. The platform area may be adapted to a specific shape of the ground area of the product to be manufactured The number of building platforms is not limited and will in practise be chosen taking into account the number of different products to be manufacture, the size of the products, the maximum dimensions of the production line or other criteria. A typical number of building platforms is between 300 and 10, more in particular between 200 and 50, or even more particular between 150 and 75. The inventors preferred a number of 100. The number of platforms may be even or odd. Basically, the is no upper limit to the number of platform. It is appreciated that the production line can in particular been exploited advantageously if it comprises a significant number of building platforms. However, the production line may have a limited number of nine buildings platforms or less to take advantage of repeated exposure to the deposition head and the possibility to pick products out of the production line without the need to stop the conveyor. The speed of the conveyor may be adjustable, either during operating the production line or in advance. Typically the speed of the conveyor may be between 10 m/s and 1 m/s, for example 2 m/s or 4 m/s depending, among others on the type of deposition heads. However, speeds higher than 10 m/s seem feasible for specific embodiments, whereas speeds lower than 1 m/s or even 0.5 m/s may be suited for other embodiments. An apparatus comprising a drop on demand deposition head may for example have a speed of 1.5 m/s or less. Adjusting during use may allow the slow down or speed up the transport of the building platforms. Such an adjustment of the speed may be advantageously when a specific process has to be performed, for example the picking or placing of a product. In a specific embodiment, the carrier or some of the carriers may comprise means to displace the building platform relative to the carrier basis in a direction perpendicular to the building direction, more in particular in the conveying direction. Such means allow an individual platform to be speeded up or slowed down relative to the other, neighbouring, platforms. Such displacement means may be suitable for placing objects on or in the product.

Figure 9:
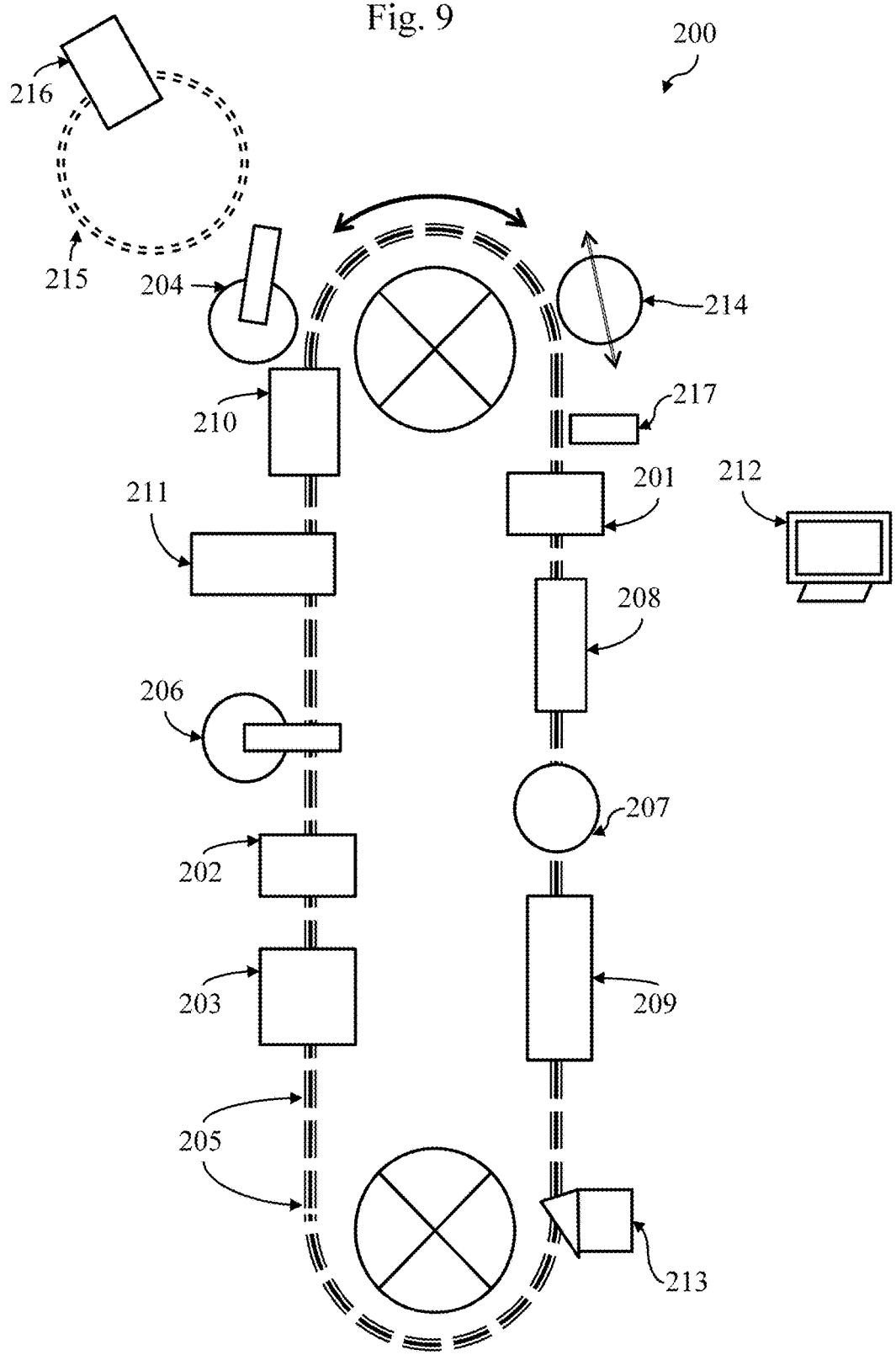
FIG. 9 is a schematic drawing of an embodiment of a production comprising several devices.

An embodiment of a production line (200) for layerwise manufacturing of tangible products is shown in FIG. 9. This figure illustrates that many different types of equipment and devices can be placed around the conveyor. Examples of such equipment and devices are a first inkjet printer (201) for printing a first type of curable resin, a second inkjet printer (202) for printing a second type of curable resin, a jetting device (203) for depositing metals like for example tin, a picking robot (204) for picking a product from a building platform (205), a placing guide (206) for placing an object on a building platform, an UV lamp (207) for curing resins, a LED array (208) for curing resins, a heating device (209) for sintering a metal-comprising layer, a height measuring station (210) for measuring the height of a product on a building platform, a layer removal device (211) for removing material, for example by cutting, a control unit (212) for controlling the production process, a height adjustment station (213) for displacing building platforms to a predefined height above the conveyor and a pick and place unit (214) for replacing products that have been tooled while being removed from the conveyor. The production line may further comprise a second conveyor (215) for processing a product in a processing station (216). Such a processing station may for example be configured for a treating a surface of the product, for depositing an atomic layer, or for inserting electronic components. Products can be placed on the second conveyor by a robot (204) and can be picked from the second conveyor to be placed on a platform (205). However, the first and second conveyor may also be configured so as that a platform is directed from the first conveyor to the second conveyor. The apparatus further may comprise a reader (217) for automatic reading of codes attached to the platforms, substrates or products. The reader may be an optical reader suitable for reading codes like a barcode or a QR code. It may however, also be a radio reader suitable for reading information from for example RFID tags, or a magnetic reader for reading information in a magnetisable strip. The reader mat sent the information to a control unit, which control unit may comprise a software program for storing information about the platform and the product placed on it. Such software program may decide about the further processing steps that have to be performed with respect to the product or the platform.

The invention relates to a method and an apparatus for making tangible products. The constructional parts mentioned in relation to the method therefore may be implemented in the apparatus, even if this is not mentioned explicitly. Further, a person skilled in the art will know how to implement the method steps into the apparatus. Also processing steps referred to in the description of the apparatus may be implemented in the method.

The invention claimed is:

1. Method for making tangible products by layerwise manufacturing comprising the steps of
depositing in a deposition area, by using a material providing device, a layer of construction material onto a first building platform for building a first layered product, conveying, by using a conveyor, and wherein the conveyor is an endless conveyor, continuously moving unidirectionally in one horizontal plane, perpendicular to gravitational force, the first building platform away from the deposition area,
removing the first layered product from the first building platform, adjusting the distance between the material providing device and the first building platform in a direction that is parallel to the building direction,
depositing construction material onto said first building platform to obtain a second layered product after the first layered product has been removed, characterised in that said adjusting is realised by moving the building platform relative to the conveyor and in that the conveyor moves the building platform past the material providing device repeatedly to obtain the first layered product, and in that the method further comprises the step of depositing in the deposition area, by using the material providing device, a further layer of construction material onto a second building platform the first and second platforms being displaceable independent of each other in the building direction relative to the conveyor.

2. Method according to claim 1, wherein, during depositing the layer, the conveyor moves the first and/or second building platforms with a speed of at least 1m/s relative to the material providing device.

3. Method according to claim 1, further comprising a step of solidifying the construction material in a predefined pattern after a layer of the material is deposited onto the first and/or second building platforms.

4. Method according to claim 1, further comprising a step of depositing a supporting material for supporting construction material.

5. Method according to claim 1, wherein the method further comprises the steps of further processing the first product after it has been removed from the first and/or second building platforms, and placing this processed first product to a third building platform that is conveyed by the conveyor.

6. Method according to claim 1, further comprising a step of removing material from the first product while said product is attached to the first and/or second building platforms.

7. Method according to claim 1 further comprising the step of placing an object on the first and/or second building platforms.

8. A production line for layerwise manufacturing of tangible products comprising:
a first building platform for carrying a tangible product,
a deposition head for providing a layer of construction material onto the first building platform defining a building direction, wherein the deposition head is placed at a fixed position,
a conveyor for conveying the first building platform in a conveying plane,
a height adjustment actuator constructed to adjust the distance between the deposition head and the first building platform, when the building platform is away from the deposition head,
wherein the conveyor is a conveyor for conveying the first building platform towards the deposition head and away from the deposition head repeatedly, and the height adjustment actuator is configured for displacing the first building platform relative to the conveyor in a direction perpendicular to the conveying plane towards the deposition head while keeping the deposition head in fixed position,
a second building platform for receiving said material, which second building platform is conveyable by said conveyor and the first and second platforms being displaceable independent of each other in the building direction relative to the conveyor, and wherein the conveyor is an endless conveyor, continuously moving unidirectionally in one horizontal plane, perpendicular to gravitational force; and
a picking unit for picking a product from the first and/or second building platforms during continuous movement by moving the picking unit during the picking time with the same velocity as the first and/or second building platforms parallel to the conveyor.

9. The production line according to claim 8, wherein the first and/or second building platforms and the height adjustment actuator are positioned on a carrier basis, which carrier basis is conveyable by the conveyor.

10. The production line according to claim 8, further comprising a placing unit for placing a product on the first and/or second building platforms.

11. The production line according to claim 8. further comprising a cutting unit for removing material from a manufactured product while the product is conveyed by the conveyor.

12. The production line according to claim 8 comprising a tuneable height adjustment device comprising a ramp for displacing the first and/or second building platforms in a vertical direction.

13. The production line according to claim 8 comprising a reader and a processing unit for controlling the processing steps of a product.

* * * * *